(12) United States Patent
Basham et al.

(10) Patent No.: US 7,676,471 B2
(45) Date of Patent: Mar. 9, 2010

(54) GRAPHICAL, MATRIXED METHOD FOR SAS FABRIC MANAGEMENT

(75) Inventors: Robert B. Basham, Aloha, OR (US); Brandon J. Herdrick, Tucson, AZ (US); Teresa S. Swingler, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 491 days.

(21) Appl. No.: 11/566,853

(22) Filed: Dec. 5, 2006

(65) Prior Publication Data

US 2008/0134072 A1   Jun. 5, 2008

(51) Int. Cl.
G06F 17/30 (2006.01)
G06F 15/177 (2006.01)
G06F 3/048 (2006.01)
G06F 13/28 (2006.01)

(52) U.S. Cl. .......................... 707/9; 715/771; 715/736; 711/163

(58) Field of Classification Search ........................ None
See application file for complete search history.

(56) References Cited

U.S. PATENT DOCUMENTS

| 5,293,615 | A | 3/1994 | Amada |
| 5,909,539 | A | 6/1999 | Chikauchi |
| 6,854,035 | B2 | 2/2005 | Dunham et al. |
| 2003/0005119 | A1 | 1/2003 | Mercier et al. |
| 2003/0149762 | A1 | 8/2003 | Knight et al. |
| 2003/0152087 | A1 | 8/2003 | Shahoumian et al. |
| 2003/0210271 | A1 | 11/2003 | King |
| 2005/0021857 | A1 | 1/2005 | Balassanian |
| 2005/0089054 | A1 | 4/2005 | Ciancaglini et al. |
| 2005/0143079 | A1 | 6/2005 | Seto |
| 2006/0174087 | A1* | 8/2006 | Hashimoto et al. .......... 711/173 |
| 2007/0067589 | A1* | 3/2007 | Mishra et al. ............... 711/163 |

OTHER PUBLICATIONS

ConnectivityZONE. "PMC-Sierra's Latest Attached-SAS Expander/Switching Devices Implement Key Zoning And Security Functions." Aug. 22, 2005. http://www.analogzone.com/iop_0822.htm.*

* cited by examiner

Primary Examiner—John R. Cottingham
Assistant Examiner—Kimberly Lovel
(74) Attorney, Agent, or Firm—Cantor Colburn LLP; Randall Bluestone

(57) ABSTRACT

In an embodiment of the present invention, in a matrixed method for serial attached SCSI (SAS) fabric management, a user is provided with a graphical dynamic matrix table, which illustrates a plurality of matrixed cells corresponding to a plurality of zone groups in a one-to-one relationship. The matrixed cells are organized as a graphical dynamic table on an X-axis and a Y-axis. The table is a packed table, meaning the X and Y axes only display populated (or active) zone groups. To modify the zoning configuration the user uses a pointing device such as a mouse to left click the appropriate matrixed cell to toggle between states. There are four states 'mutual access', 'previous mutual access', 'proposed mutual access', and 'no access'.

4 Claims, 5 Drawing Sheets

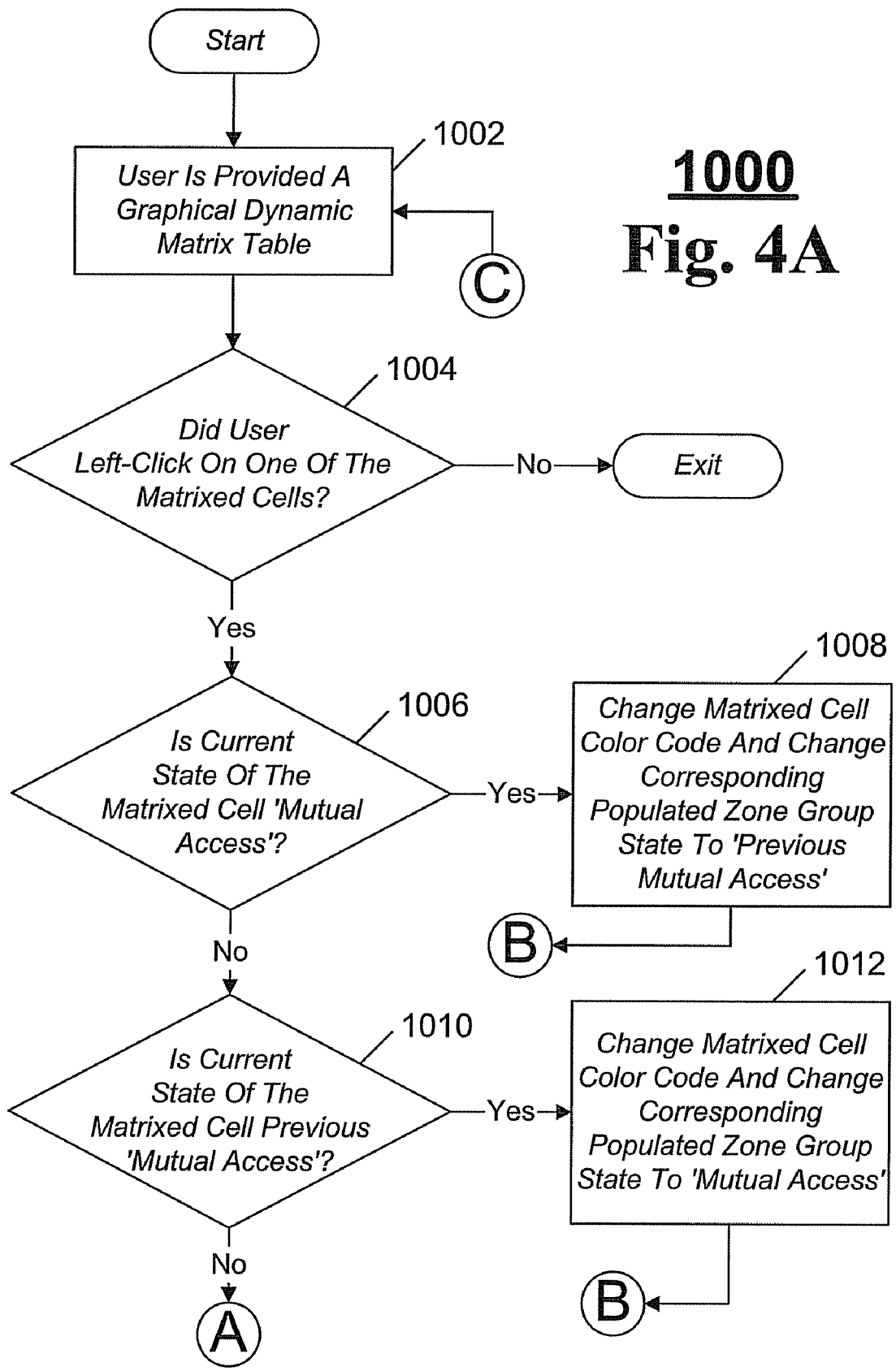

GRAPHICAL, MATRIXED METHOD FOR SAS FABRIC MANAGEMENT

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to a matrixed method for serial attached SCSI (SAS) fabric management, and particularly to a user being provided with a graphical dynamic matrix table, which illustrates a plurality of matrixed cells corresponding to a plurality of zone groups in a one-to-one relationship. The matrixed cells are organized as a graphical dynamic table on an X-axis and a Y-axis. The table is a packed table, meaning the X and Y-axes only display populated (or active) zone groups. Populated (or active) zone groups are defined as zone groups that contain at least one port. The user can modify the zoning configuration by left clicking the appropriate matrixed cell to toggle between states. There are four states 'mutual access', 'previous mutual access', 'proposed mutual access', and 'no access'.

2. Description of Background

Storage Area Network (SAN) is a high-speed sub network of host servers and shared storage devices. A storage device is a machine that contains a controller card or controller cards, and a disk or disks for storing data.

A SAN's architecture works in a way that makes all storage devices available to all servers on an interconnect of storage and host servers, typically comprised of specialized switches specifically designed for routing I/O data traffic. As storage devices are added to a SAN, they are accessible from any server in the larger network. In this case, the server merely acts as a pathway between the end user and the stored data.

Because stored data does not reside directly on any of a network's servers, server power is utilized for business applications, and network capacity is released to the end user.

Serial Attached SCSI (SAS) is an evolution of parallel SCSI into a point-to-point serial peripheral interface in which controllers are linked directly to disk drives. SAS is a performance improvement over traditional SCSI because SAS enables multiple devices (up to 128) of different sizes and types to be connected simultaneously with thinner and longer cables; its full-duplex signal transmission supports 3.0 Gb/s. In addition, SAS drives can be hot-plugged.

In topologies with more than two connected devices, SAS calls for the use of expander devices to allow for one or more hosts to connect to one or more peripherals.

SAS devices can communicate with both serial-ATA (SATA) and SCSI devices (the backplanes of SAS devices are identical to SATA devices). A key difference between SCSI and SAS devices is the addition in SAS devices of two data ports, each of which resides in a different SAS domain. This enables complete failover redundancy as if one path fails; there is still communication along a separate and independent path. The devices typically communicated by way of Serial Attached Small Computer System Interface (SAS) protocol.

The configuration and management of such networking and storage device topology can be difficult. Current graphical user interface methods for SAS fabric management don't show the configurations in an easy, intuitive manner. In this regard, SAS fabric management is challenging in that unlike Fibre Channel zoning it requires an additional layer of indirection. In other words, it requires the additional concept of a zone group. All of which gives rise to a long felt need for the present invention.

SUMMARY OF THE INVENTION

The shortcomings of the prior art are overcome and additional advantages are provided through the provision of a matrixed method for serial attached SCSI (SAS) fabric management, the method comprising: providing a user with a graphical dynamic matrix table, the graphical dynamic matrix table having a plurality of matrixed cells organized on an X-axis and a Y-axis, the graphical dynamic matrix table is a packed table indicating that the X-axis and the Y-axis only display a plurality of populated zone groups, each of the plurality of matrixed cells is color coded to indicate a state of and corresponds to one of the plurality of populated zone groups in a one-to-one relationship; allowing the user, by use of a pointing device to left-clicking on one of the plurality of matrixed cells, to select one of the plurality of matrixed cells; modifying said state of the plurality of populated zone groups corresponding to the plurality of matrixed cells selected by the user, the state is modified with each the pointing device left-click in a predetermined pattern as follows: from mutual access to previous mutual access; from previous mutual access to mutual access; from proposed mutual access to no access; or from no access to proposed mutual access; and updating the graphical dynamic matrix table to display the current state of each of the plurality of populated zone groups.

In addition, the shortcomings of the prior art are overcome and additional advantages are provided through the provision of a matrixed method for serial attached SCSI (SAS) fabric management, the method comprising: providing a user with a graphical port mapping matrix table, the graphical port mapping matrix table having a plurality of matrixed cells organized on an x-axis and a y-axis, the graphical port mapping matrix table is a packed table indicating that the x-axis and the y-axis only display a plurality of populated port mappings, each of the plurality of populated port mappings corresponds to each of the plurality of matrixed cells in a one-to-one relationship; obtaining a state for each of the plurality of populated port mappings; distinguishing each of the plurality of matrixed cells by dual color coding to indicate a state, the state being either access or no access; organizing the graphical port mapping matrix table into a plurality of bound quadrants, the plurality of bound quadrants including a server-to-server quadrant, a storage-to-storage quadrant, and a server-to-storage quadrant; and displaying the graphical port mapping matrix table.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution, which enables a user using a graphical mapping zone groups to change the state of each group by using a pointing device to left-clicking on the desired matrixed cell.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

FIG. 4A-4B illustrates one example of a method of changing the state of a populated zone group utilizing a graphical dynamic matrix table routine 1000.

The detailed description explains the preferred embodiments of the invention, together with advantages and features, by way of example with reference to the drawings.

DETAILED DESCRIPTION OF THE INVENTION

Turning now to the drawings in greater detail, in an exemplary embodiment of the present invention computer software is utilized to map zone groups and to enable a user to change the state of each group by left-clicking on the desired matrixed cell. Such computer software can reside on a web server, mm on a local personal computer, and or run on other types and kinds of computing platforms.

With regard to the matrixed cells, color coded matrix cells each correspond to a populated zone group in a one-to-one relationship. Color codes are used to represent the four possible states 'mutual access', 'proposed mutual access', 'previous mutual access', and 'no access'. Left clicking can be done with a computer mouse or other required, desired, and or similar type or kind of pointing device and or selecting device.

Each time the user left-clicks on a matrixed cell the state of the corresponding populated zone group changes in a predetermined way. In this regard, if the current state of the populated zone group is 'mutual access' then the state will be changes to 'previous mutual access'; if the current state of the populated zone group is 'previous mutual access' then the state will be changes to 'mutual access'; if the current state of the populated zone group is 'proposed mutual access' then the state will be changes to 'no access'; and if the current state of the populated zone group is 'no access' then the state will be changes to 'proposed mutual access'.

In an exemplary embodiment, the present invention is a graphical, matrixed method for storage area network (SAN) fabric management. One advantage of the present invention is that it provides an efficient way to map zone groups, while still providing a complete view of the fabric. In this regard, the graphics involve a way to map both zone groups and then a way to look at how that mapping affects ports as well.

In operation, the present invention works by providing the user with a graphical dynamic matrix table. Zone groups are shown on an X-axis and a Y-axis. The table is referred to as a packed table, meaning that the X-axis and the Y-axis only display populated zone groups. That is, zone groups that have a port assigned to them. To modify the zoning configuration of a populated zone group, the user left-clicks on the desired matrixed cell. Each matrixed cell corresponds to a populated zone group in a one-to-one relationship. When the user left-clicks the desired matrixed cell the corresponding populated zone group will toggle between states. The states are 'mutual access', 'previous mutual access', 'proposed mutual access', and 'no access'.

Figure 1:
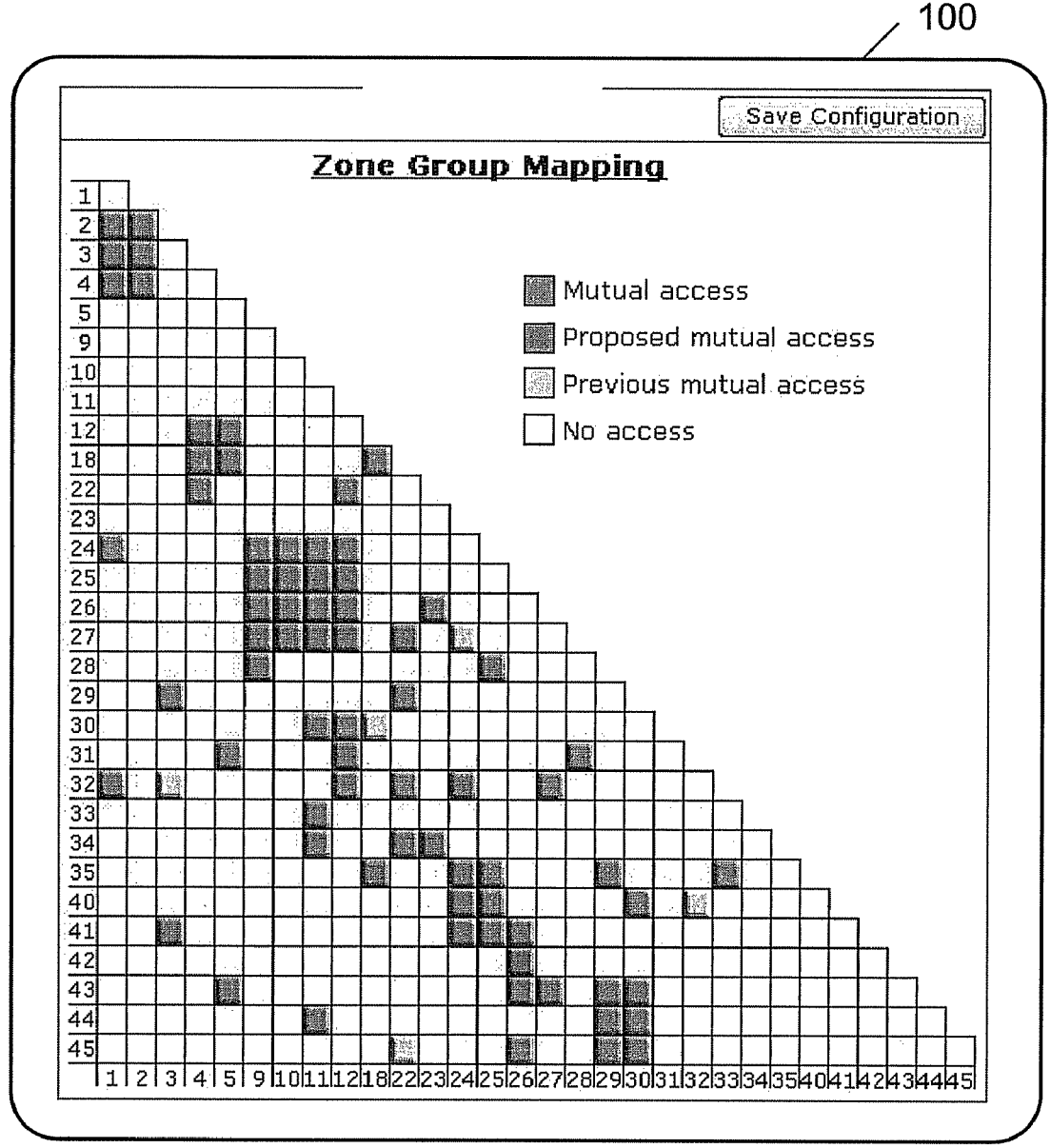
FIG. 1 illustrates one example of a graphical dynamic matrix table 100.

Referring to FIG. 1 there is illustrated one example of a graphical dynamic matrix table 100. The figure illustrates how a plurality of matrixed cells being color-coded and corresponding to a plurality of populated zone groups in a one-to-one relationship can be graphically displayed on an X-axis and a Y-axis.

Figure 2:
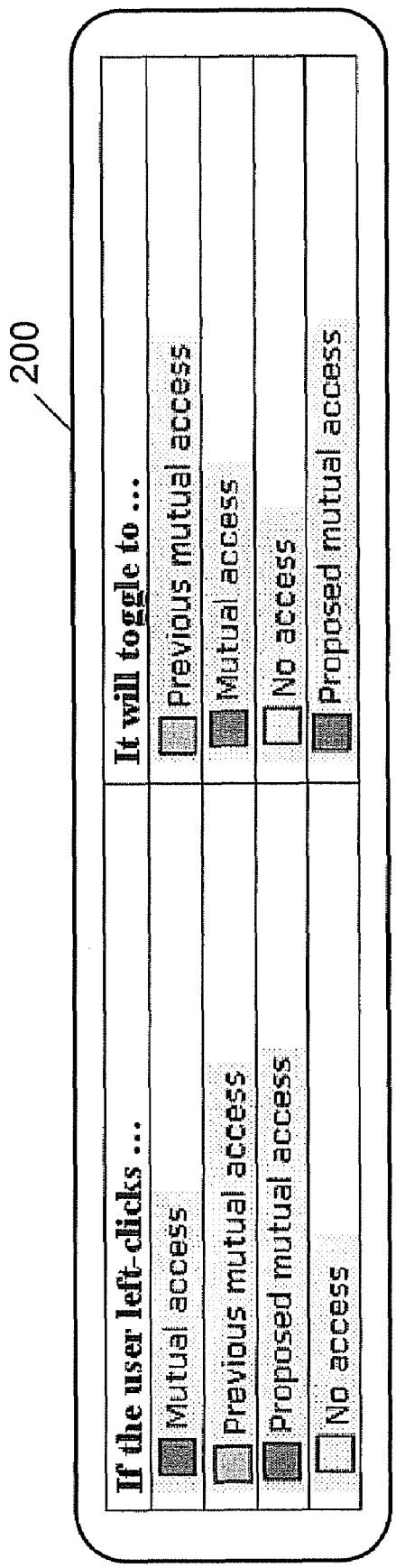
FIG. 2 illustrates one example of a legend block 200 detailing how the populated zone group corresponding to the user selected matrixed cell will change from a current state to a next state when the user left-clicks on the desired matrixed cell.

Referring to FIG. 2 there is illustrated a legend block 200 detailing how the populated zone group corresponding to the user selected matrixed cell will change from a current state to a next state when the user left-clicks on the desired matrixed cell.

Figure 4B:
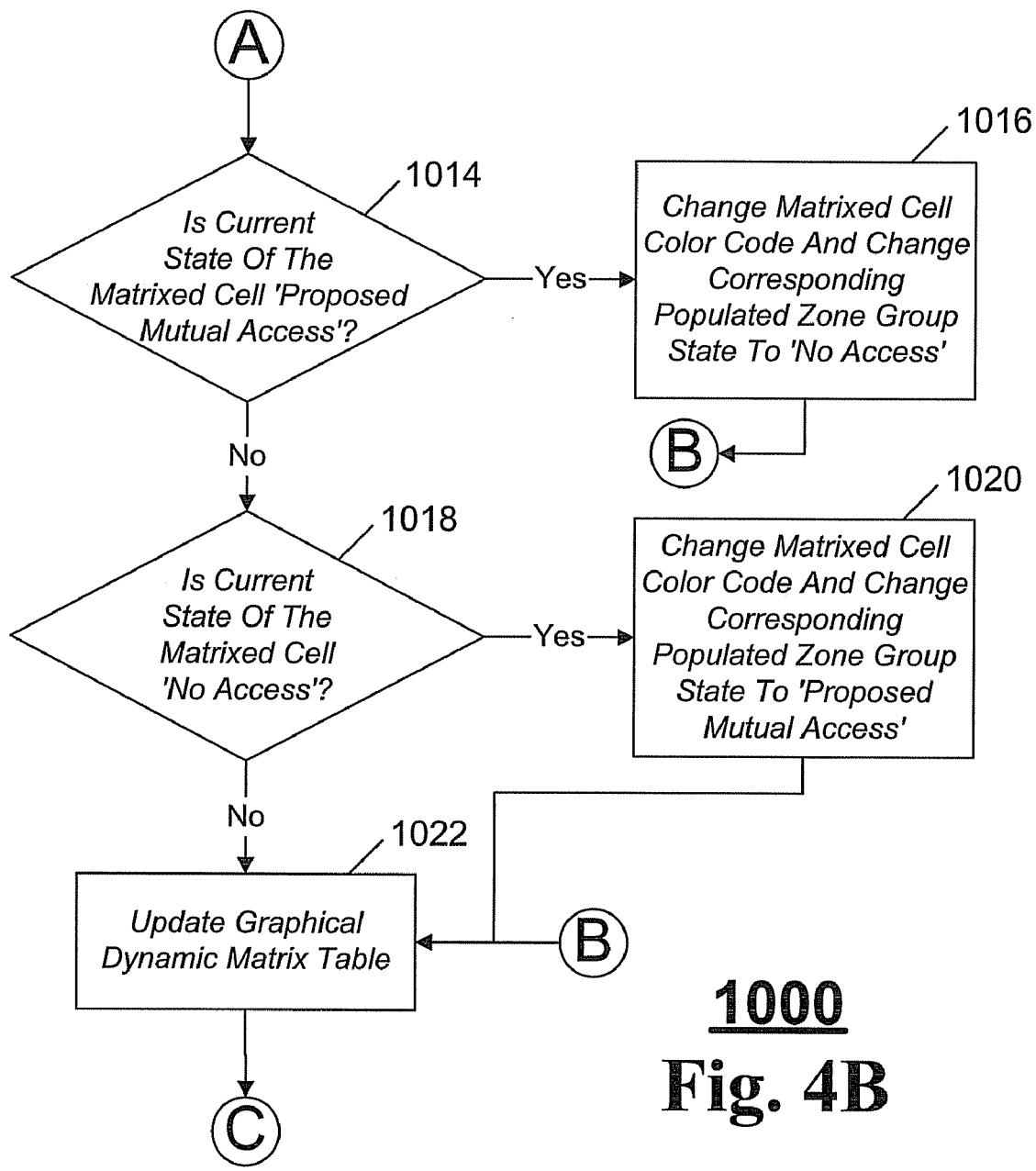

Referring to FIGS. 4A and 4B there is illustrated one example of a method of changing the state of a populated zone group utilizing a graphical dynamic matrix table routine 1000. The method begins in block 1002.

In block 1002 a graphical dynamic matrix table having a plurality of matrixed cells, wherein each one of the matrixed cells correspond to a populated zone group in a one-to-one relationship is displayed to the user. Processing then moves to decision block 1004.

In decision block 1004 a determination is made as to whether or not the user left-clicked on one of the matrixed cells. If the resultant is in the affirmative that is the user left clicked on one of the matrixed cells than processing moves to decision block 1006. If the resultant is in the negative that is the user did not left click on one of the matrixed cells then the routine is exited.

In decision block 1006 a determination is made as to whether or not the current state of the populated zone group corresponding to the user selected matrixed cell is currently in the state of 'mutual access'. If the resultant is in the affirmative that is the current state is 'mutual access' then processing moves to block 1008. If the resultant is in the negative that is the current state is not 'mutual access' then processing moves to decision block 1010.

In block 1008 the state of the populated zone group corresponding to the user selected matrixed cell is change to 'previous mutual access' and the color coding of the matrixed cell is changed accordingly. Processing then moves to block 1022.

In decision block 1010 a determination is made as to whether or not the current state of the populated zone group corresponding to the user selected matrixed cell is currently in the state of 'previous mutual access'. If the resultant is in the affirmative that is the current state is 'previous mutual access' then processing moves to block 1012. If the resultant is in the negative that is the current state is not 'previous mutual access' then processing moves to decision block 1014.

In block 1012 the state of the populated zone group corresponding to the user selected matrixed cell is change to 'mutual access' and the color coding of the matrixed cell is changed accordingly. Processing then moves to block 1022.

In decision block 1014 a determination is made as to whether or not the current state of the populated zone group corresponding to the user selected matrixed cell is currently in the state of 'proposed mutual access'. If the resultant is in the affirmative that is the current state is 'proposed mutual access' then processing moves to block 1016. If the resultant is in the negative that is the current state is not 'proposed mutual access' then processing moves to decision block 1018.

In block 1016 the state of the populated zone group corresponding to the user selected matrixed cell is change to 'no access' and the color coding of the matrixed cell is changed accordingly. Processing then moves to block 1022.

In decision block 1018 a determination is made as to whether or not the current state of the populated zone group corresponding to the user selected matrixed cell is currently in the state of 'no access'. If the resultant is in the affirmative that is the current state is 'no access' then processing moves to block 1020. If the resultant is in the negative that is the current state is not 'no access' then processing moves to decision block 1022.

In block 1016 the state of the populated zone group corresponding to the user selected matrixed cell is change to 'proposed mutual access' and the color coding of the matrixed cell is changed accordingly. Processing then moves to block 1022.

In block 1022 the graphical dynamic matrix table is updated. Processing returns to block 1002.

Figure 3:
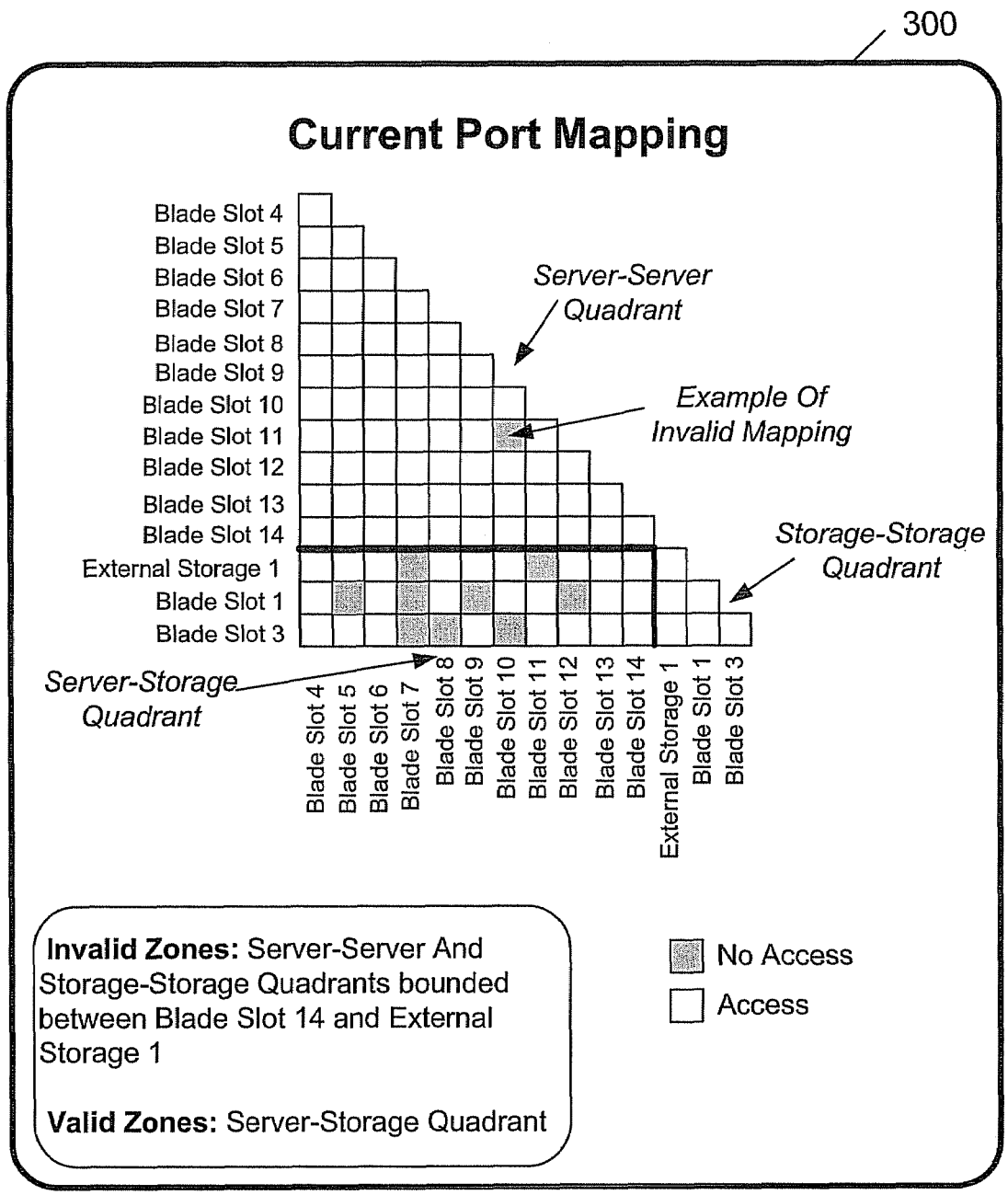
FIG. 3 illustrates one example of a graphical current port mapping table 300.

Referring to FIG. 3 there is illustrated one example of a graphical current port mapping table 300. In another exemplary embodiment of the present invention, an additional view referred to, as a port graph or port mapping table 300 is similar, only it involves showing which ports have access to which ports. This alternative port graph is not actually used to do zoning configuration but rather to show the results. As such, only two color codes are needed to show two states 'access' or 'no access'. The port graph can be made more useful by arranging columns and rows by 'Initiator', 'Target', 'Switch', and 'Unknown'. This divides the graph or bounds the graph into areas of interest.

For example and not limitation, there is an area that would show 'Initiator Ports' mapped to other 'Initiator Ports', which is not really a valid configuration. Another area would show 'Target ports' to 'Target ports'. This is another invalid configuration. Another area shows 'Target Ports' and 'Initiator Ports' to 'switch ports', showing which ports have external access. The most commonly used area would be ports showing 'Target Ports' mapped to 'Initiator Ports'.

Referring to FIG. 3 a similar exemplary embodiment is illustrated where bound quadrants including a server-to-server quadrant, a server-to-storage quadrant, and server-to-storage quadrant are illustrated. The 'not valid' configurations are the server-server and storage-storage quadrants bounded between Blade Slot 14 and External Storage 1. The 'valid' quadrant is the server-to-storage quadrant. Also illustrated in FIG. 3 are 'access' and 'no access' areas.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A matrixed method for serial attached small computer system interface (SAS) fabric management, said method comprising:
   providing a user with a graphical dynamic matrix table, said graphical dynamic matrix table having a plurality of matrixed cells organized on an x-axis and a y-axis, said graphical dynamic matrix table is a packed table indicating that said x-axis and said y-axis only display a plurality of populated zone groups, each of said plurality of matrixed cells is color coded to indicate a state of and corresponds to one of said plurality of populated zone groups in a one-to-one relationship;
   allowing said user, by use of a pointing device to left-click on one of said plurality of matrixed cells, to select one of said plurality of matrixed cells;
   modifying said state of said plurality of populated zone groups corresponding to said plurality of matrixed cells selected by said user, said state is modified with each said pointing device left-click in a predetermined pattern as follows:
      from mutual access to previous mutual access;
      from previous mutual access to mutual access;
      from proposed mutual access to no access; and
      from no access to proposed mutual access; and
   updating said graphical dynamic matrix table to display the current state of each of said plurality of populated zone groups;
   wherein said graphical dynamic matrix table is utilized to effectuate the management of a storage area network (SAN).

2. The method in accordance with claim 1, wherein a web server generates said graphical dynamic matrix table.

3. The method in accordance with claim 1, wherein a local personal computer generates said graphical dynamic matrix table.

4. The method in accordance with claim 1, wherein said pointing device is a computer mouse.

* * * * *